(12) United States Patent
Wear et al.

(10) Patent No.: US 11,674,536 B2
(45) Date of Patent: Jun. 13, 2023

(54) GUIDE ELEMENT FOR HYDRAULIC FLUID

(71) Applicant: Caterpillar Inc., Peoria, IL (US)

(72) Inventors: Daniel Gregory Wear, East Peoria, IL (US); Thomas K. Shim, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 200 days.

(21) Appl. No.: 17/247,496

(22) Filed: Dec. 14, 2020

(65) Prior Publication Data

US 2022/0186757 A1 Jun. 16, 2022

(51) Int. Cl.
*F15D 1/06* (2006.01)
*G05D 7/03* (2006.01)

(52) U.S. Cl.
CPC ................... *F15D 1/06* (2013.01); *G05D 7/03* (2013.01)

(58) Field of Classification Search
CPC .................................. G01N 15/06; F15D 1/04
USPC .............................................. 138/37, 39, 44
See application file for complete search history.

(56) References Cited

U.S. PATENT DOCUMENTS

| | | | |
|---|---|---|---|
| 3,838,598 A * | 10/1974 | Tompkins | G01F 1/42 73/861.52 |
| 4,118,973 A * | 10/1978 | Tucker | G01F 1/42 73/54.04 |
| 5,525,303 A | 6/1996 | Ford | |
| 7,162,057 B1 | 1/2007 | Roth et al. | |
| 7,208,123 B2 | 4/2007 | Knollenberg et al. | |
| 7,307,717 B2 | 12/2007 | Kolp et al. | |
| 7,476,851 B2 | 1/2009 | Wang et al. | |
| 7,518,720 B2 | 4/2009 | Kolp et al. | |
| 9,188,122 B1 * | 11/2015 | Reed | F16K 15/066 |
| 9,542,506 B2 | 1/2017 | Chen et al. | |
| 9,874,467 B2 | 1/2018 | Maginnis et al. | |
| 10,466,226 B2 | 11/2019 | Shigemaru | |
| 2005/0121615 A1 | 6/2005 | Prater et al. | |
| 2006/0237081 A1 * | 10/2006 | Lucas | F04B 39/0055 138/26 |
| 2009/0031830 A1 * | 2/2009 | Kolp | G01N 21/09 73/866.3 |
| 2010/0327205 A1 | 12/2010 | Tan | |

(Continued)

FOREIGN PATENT DOCUMENTS

| | | | | |
|---|---|---|---|---|
| EP | 3499171 A1 * | 6/2019 | | F28D 7/16 |
| JP | 4241740 B2 | 1/2009 | | |
| WO | 20190115583 W | 6/2019 | | |

OTHER PUBLICATIONS

Written Opinion and International Search Report for Int'l. Patent Appln. No. PCT/US2021/062997, dated Feb. 23, 2022 (10 pgs).

*Primary Examiner* — Patrick F Brinson
(74) *Attorney, Agent, or Firm* — Harrity & Harrity LLP

(57) ABSTRACT

A guide element for hydraulic fluid includes a first end surface, a second end surface, and an exterior surface connecting the first end surface to the second end surface. The first end surface includes a first chamfered opening. The second end surface includes a second opening that fluidly communicates with the first opening to define a longitudinal bore that includes a tapered section. The first chamfered opening and the tapered section are configured to guide the hydraulic fluid to facilitate transformation of a turbulent flow of the hydraulic fluid into a laminar flow of the hydraulic fluid.

20 Claims, 6 Drawing Sheets

(56) References Cited

U.S. PATENT DOCUMENTS

2014/0373940 A1\* 12/2014 Toader, Jr. ............ F15B 21/041
　　　　　　　　　　　　　　　　　　　　　　　　　137/267
2015/0127275 A1　　5/2015　Hies et al.
2016/0161311 A1　　6/2016　Olin et al.

\* cited by examiner

GUIDE ELEMENT FOR HYDRAULIC FLUID

TECHNICAL FIELD

The present disclosure relates generally to a particle sensor assembly and, for example, to a guide element for hydraulic fluid.

BACKGROUND

Hydraulic fluid is a key component of many mobile and stationary machines. For example, hydraulic fluid may be used as a lubricant or to facilitate power transfer and/or heat transfer within a system. However, over time, solid particulate may accumulate in hydraulic systems due to ingression of external sources such as dust or sand, or from internal sources such as gear, bearing, or pump wear, which may cause damage or detrimental performance of the systems. To monitor contamination within the hydraulic fluid, some systems may utilize a sensor assembly, which may be cumbersome, expensive, and limited in applicability.

U.S. Pat. No. 4,940,333, which issued to Pawliszyn on Jul. 10, 1990, discloses a detector which measures concentration gradients within a sample. The detector includes a sample chamber, a light source adapted to pass a probe beam of light through the sample chamber, means for detecting the position of the probe beam of light after passing through and leaving the sample chamber, and means for periodically supplying excitation energy to the sample chamber adapted to be absorbed by preselected chemical compounds if present in the chamber. In this way, if the preselected chemical compound is present, it will absorb the excitation energy and create a temperature gradient through photothermal process in the sample that substantially corresponds to the concentration gradient of that chemical in the sample. This temperature gradient will form refractive index gradient and therefore it will also be detected by the probe light beam passing through the sample chamber.

The particle sensor assembly of the present disclosure solves one or more of the problems set forth above and/or other problems in the art.

SUMMARY

In some implementations, a guide element for hydraulic fluid includes a first end surface, a second end surface, and an exterior surface connecting the first end surface to the second end surface, wherein the first end surface includes a first chamfered opening and at least one notch, and the second end surface includes a second opening that fluidly communicates with the first opening to define a longitudinal bore that includes a tapered section, wherein the first chamfered opening, the at least one notch, and the tapered section are configured to guide the hydraulic fluid to facilitate transformation of a turbulent flow of the hydraulic fluid into a laminar flow of the hydraulic fluid.

In some implementations, a guide element for fluid includes a first end surface, a second end surface, and an exterior surface connecting the first end surface to the second end surface, wherein the first end surface includes a first opening, the second end surface includes a second opening that fluidly communicates with the first opening to define a longitudinal bore, the longitudinal bore includes a truncated conical section that is configured to reduce turbulence of the fluid flowing therethrough; and the exterior surface is at least partially threaded along a length thereof.

In some implementations, a guide element for hydraulic fluid includes a first end surface, a second end surface, and an exterior surface connecting the first end surface to the second end surface, wherein the first end surface includes: a first opening, and a plurality of notches that are eccentrically arranged relative to the first opening, the second end surface includes a second opening that fluidly communicates with the first opening to define a longitudinal bore that includes a tapered section, wherein the plurality of notches and the tapered section are configured to guide the hydraulic fluid to facilitate transformation of a turbulent flow of the hydraulic fluid into a laminar flow of the hydraulic fluid.

DETAILED DESCRIPTION

This disclosure relates to a particle sensor assembly, which is applicable to any system involving a translucent fluid. For example, the fluid may be hydraulic fluid (e.g., mineral oil, water glycol, phosphate ester) or another type of fluid. The system may be implemented in a machine, such as an automobile, a bulldozer, a crane, an excavator, a tractor, or another type of machine.

To simplify the explanation below, the same reference numbers may be used to denote like features. The drawings may not be to scale.

Figure 1:
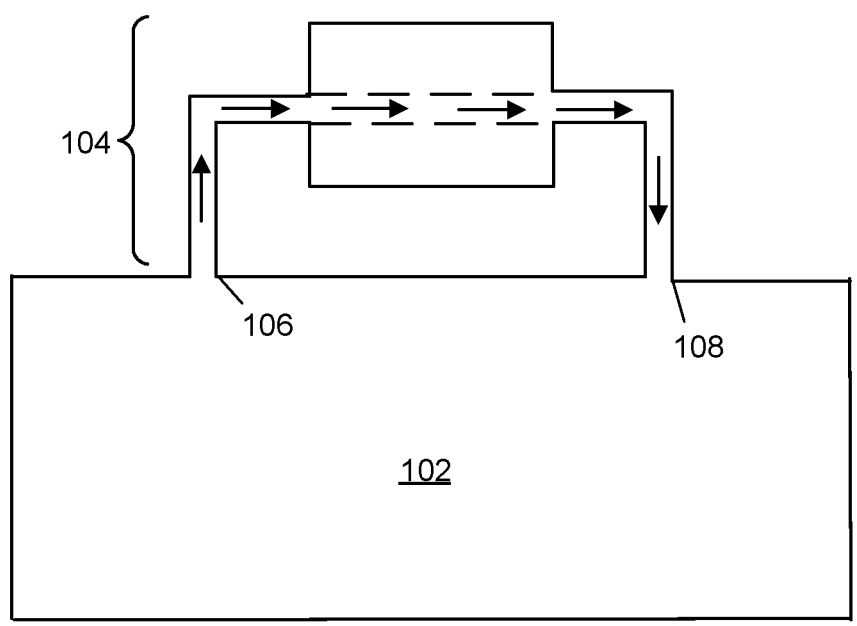
FIG. 1 is a schematic diagram of a fluid monitoring system having a particle sensor assembly.

FIG. 1 is a schematic diagram of a fluid monitoring system 100, which includes a fluid source 102 and a particle sensor assembly 104. The fluid source 102 serves as a source of hydraulic fluid that is to pass through the particle sensor assembly 104. For example, the fluid source 102 may be a reservoir, a pipe, a manifold, a transmission, a filter base, or another type of enclosure having a first hole 106 and a second hole 108. In order to monitor an amount of debris particles (e.g., dust, sand, or other types of particles) therein, the fluid source 102 is attached to the particle sensor assembly 104, which will be described below in connection with FIGS. 2-3. As indicated by the arrows, the hydraulic fluid may pass through the first hole 106 and re-enter the fluid source 102 via the second hole 108 after travelling along a path through the particle sensor assembly 104.

It should be understood that FIG. 1 illustrates a generic flow path of the hydraulic fluid (e.g., out of the fluid source 102, through the particle sensor assembly 104, and back into the fluid source 102) and is not intended to illustrate how the particle sensor assembly 104 is configured and/or attached to the fluid source 102. Depending on space constraints or other factors, the particle sensor assembly 104 may form different configurations, which may alter the shape and/or length of the path. Examples of the different configurations will be described in connection with FIGS. 6-8.

As indicated above, FIG. 1 is provided as an example. Other examples may differ from what is described with regard to FIG. 1. For example, the number and arrangement of components may differ from that shown in FIG. 1. Thus, there may be additional components, fewer components, different components, and/or differently arranged components than those shown in FIG. 1.

Figure 2:
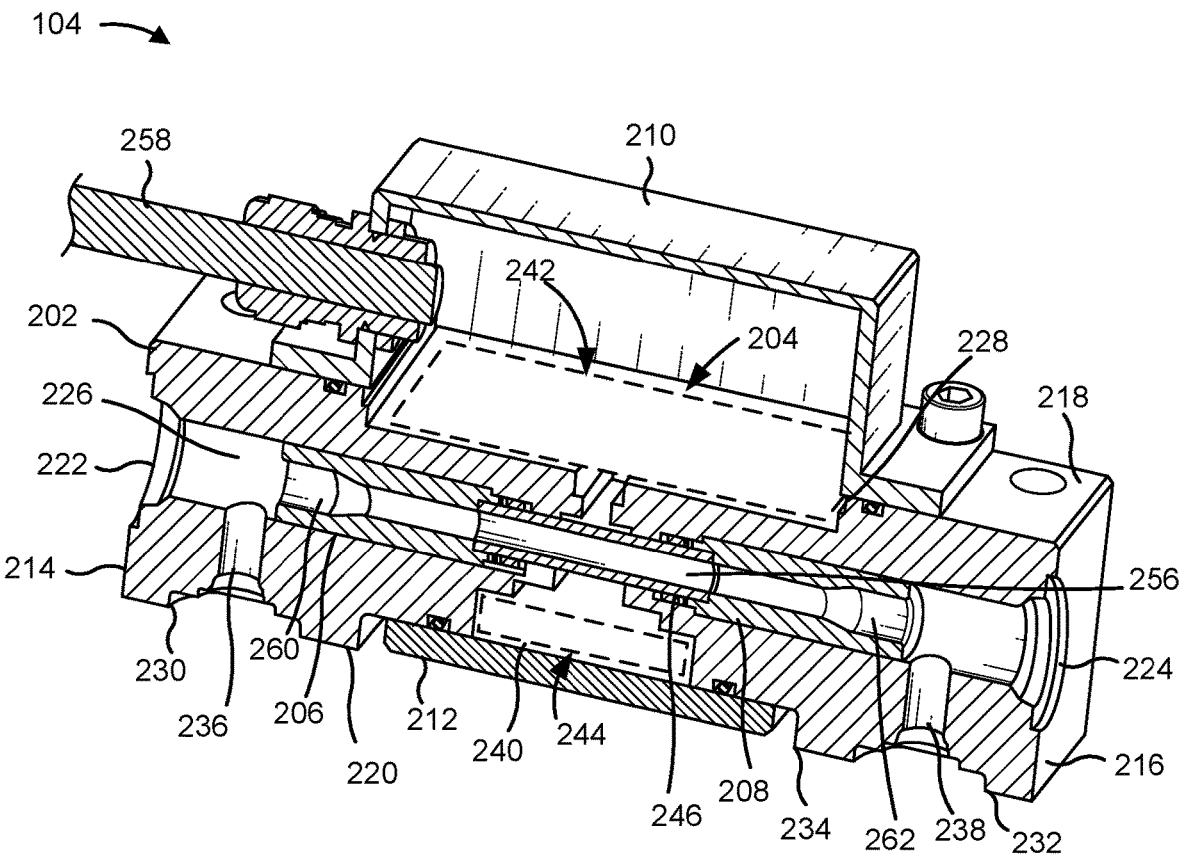
FIG. 2 is a cross-sectional view of the particle sensor assembly.
Figure 3:
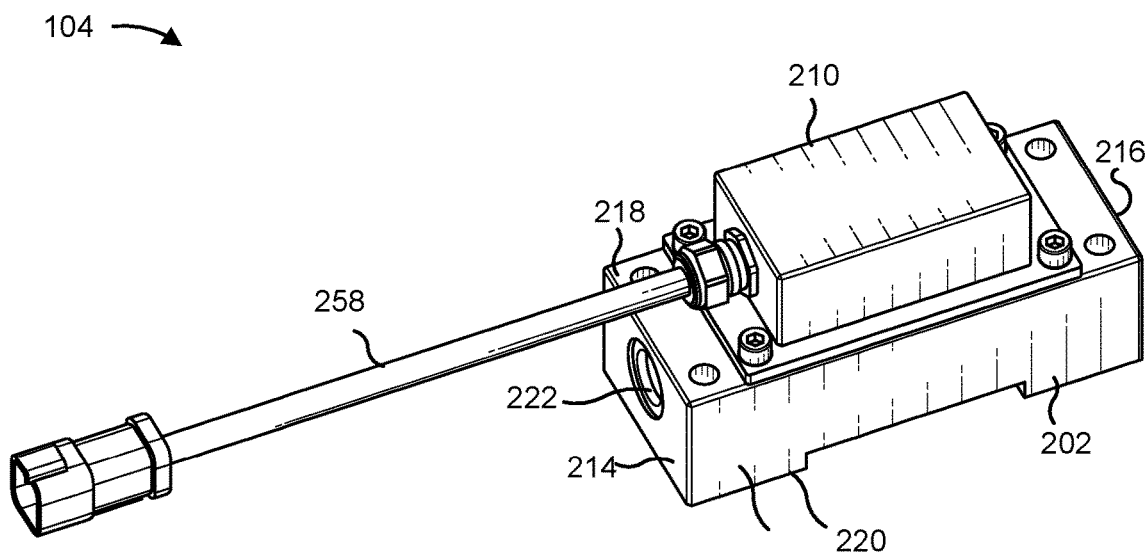
FIG. 3 is an isometric view of the particle sensor assembly.

FIGS. 2-3 are diagrams of the particle sensor assembly 104. FIG. 2 is a cross-sectional view of the particle sensor assembly 104. FIG. 3 is an isometric view of the particle sensor assembly 104.

The particle sensor assembly 104 includes a housing 202, a particle sensor 204, a first guide element 206, a second guide element 208, a cover 210, and a base plate 212. The housing 202, which may be made of a single, integral piece of material (e.g., steel), includes a first end surface 214, a second end surface 216, a top surface 218, and a bottom surface 220. The first end surface 214 includes a first end opening 222. The second end surface 216, which opposes the first end surface 214, includes a second end opening 224 that communicates with the first end opening 222 to define a longitudinal bore 226. The longitudinal bore 226 may be at least partially threaded or otherwise configured to receive the first guide element 206 and the second guide element 208. The top surface 218 connects the first end surface 214 to the second end surface 216 and includes a top opening 228. The bottom surface 220, which opposes the top surface 218, includes a first bottom opening 230, a second bottom opening 232, and a third bottom opening 234. The first bottom opening 230 communicates with a first intersecting bore 236 that intersects with the longitudinal bore 226. The second bottom opening 232 communicates with a second intersecting bore 238 that intersects with the longitudinal bore 226. The third bottom opening 234, which is positioned between the first bottom opening 230 and the second bottom opening 232, communicates with the top opening 228 to define a detection chamber 240 for the particle sensor 204. The detection chamber 240 intersects with the longitudinal bore 226. The first intersecting bore 236, the second intersecting bore 238, and the detection chamber 240 may intersect with the longitudinal bore 226 at an angle of approximately 90 degrees. Other angles of intersection may be possible.

In order to receive one or more modular components, as will be described below in connection with FIGS. 6-8, the first end opening 222, the second end opening 224, the first bottom opening 230, and the second bottom opening 232 may be tapered. For example, one or more of the first end opening 222, the second end opening 224, the first bottom opening 230, and the second bottom opening 232 may form a countersink or a counterbore. Additionally, or alternatively, the first intersecting bore 236 and the second intersecting bore 238 may be at least partially threaded or otherwise configured to receive the one or more modular components. Similarly, the top opening 228 and the third bottom opening 234 may form counterbores to respectively receive components of the particle sensor 204 and the base plate 212.

The particle sensor 204 is an optical sensor that includes a light source 242, a detector 244, and a transparent tube 246 arranged therebetween. The light source 242 may include, for example, a light-emitting diode secured within the top opening 228 of the housing 202. The detector 244 may include, for example, a photodiode situated within the detection chamber 240 to process a pattern of the light passing from the light source 242 through the transparent tube 246. The transparent tube 246, which defines a passage 256 for the hydraulic fluid, is concentrically arranged within the longitudinal bore 226 to extend across the detection chamber 240 and receive the light from the light source 242. The transparent tube 246 may be formed of glass or another type of transparent material. An electric cable 258 may allow the particle sensor 204 to transmit information from the detector 244 to a user interface. Additionally, or alternatively, the electric cable 258 may provide power to the particle sensor 204. Other sources of power, such as a battery and/or a solar panel, may be possible.

The first guide element 206 and the second guide element 208 are concentrically arranged within the longitudinal bore 226 at opposite sides of the transparent tube 246. The first guide element 206 has a first longitudinal bore 260, and the second guide element 208 has a second longitudinal bore 262. The first longitudinal bore 260 and the second longitudinal bore 262 fluidly communicate with the passage 256 of the transparent tube 246 to allow the hydraulic fluid to pass therethrough. As will be described below in connection with FIGS. 3-4, the first guide element 206 and the second guide element 208 are structured and arranged to facilitate transformation of a turbulent flow of the hydraulic fluid into a laminar flow of the hydraulic fluid.

The cover 210 is arranged over the top opening 228 to protect the light source 242 and connect the electric cable 258 to the particle sensor 204. The base plate 212 is secured within the third bottom opening 234 of the bottom surface 220 to protect the detector 244. In other words, the cover 210 and the base plate 212 enclose the particle sensor 204 within the detection chamber 240. The cover 210 and the base plate 212 may be secured to the housing 202 via bolts or other types of fasteners (e.g., screws, clips, and/or the like).

The particle sensor assembly 104, in order to enclose the particle sensor 204, the first guide element 206, and the second guide element 208, has a width in a range of approximately 50 millimeters (mm) to approximately 100 mm, a height in a range of approximately 50 mm to approximately 100 mm, and a length in a range of approximately 100 mm to 200 mm. To secure the first guide element 206, the second guide element 208, and the transparent tube 246 therebetween, the longitudinal bore 226 has a diameter in a range of approximately 12 mm to approximately 15 mm and a length in a range of approximately 100 mm to approximately 200 mm. A diameter of the first intersecting bore 236 and/or the second intersecting bore 238 may be less than or equal to the diameter of the longitudinal bore 226. Other dimensions are contemplated.

As indicated above, FIGS. 2-3 are provided as an example. Other examples may differ from what is described with regard to FIGS. 2-3. For example, the number and arrangement of components may differ from that shown in FIGS. 2-3. Thus, there may be additional components, fewer components, different components, differently shaped components, differently sized components, and/or differently arranged components than those shown in FIGS. 2-3. For example, to simplify production and/or reduce costs, the particle sensor assembly 104 may include only one of the first guide element 206 or the second guide element 208.

Figure 4:
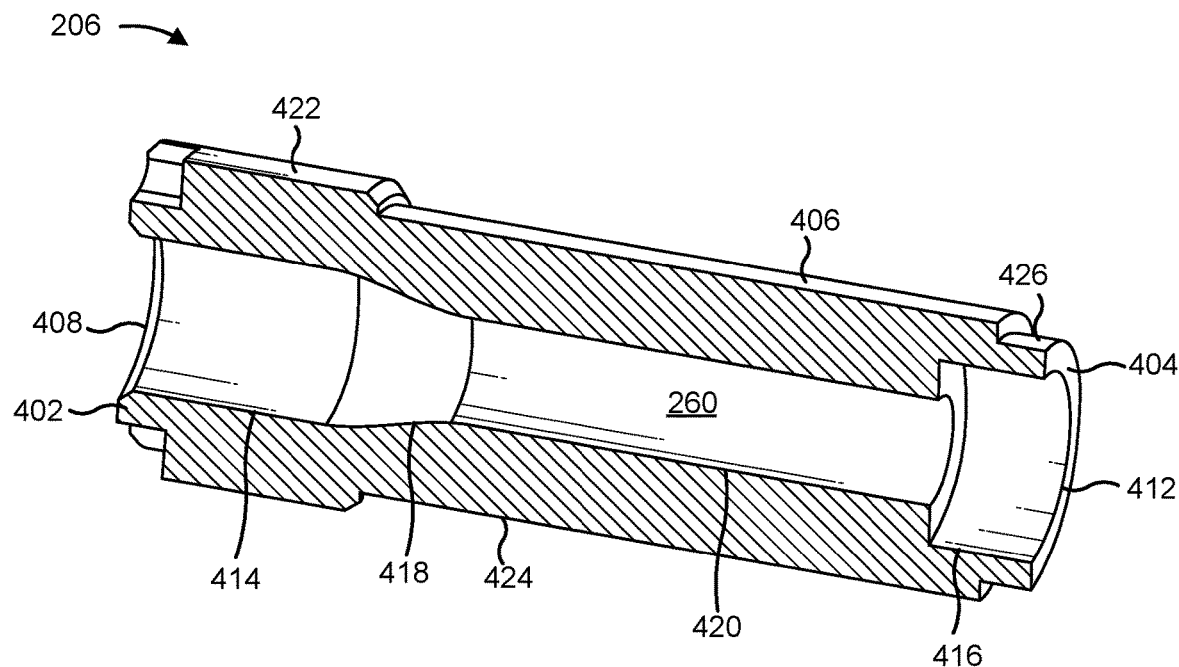
FIG. 4 is a cross-sectional view of a guide element of the particle sensor assembly.
Figure 5:
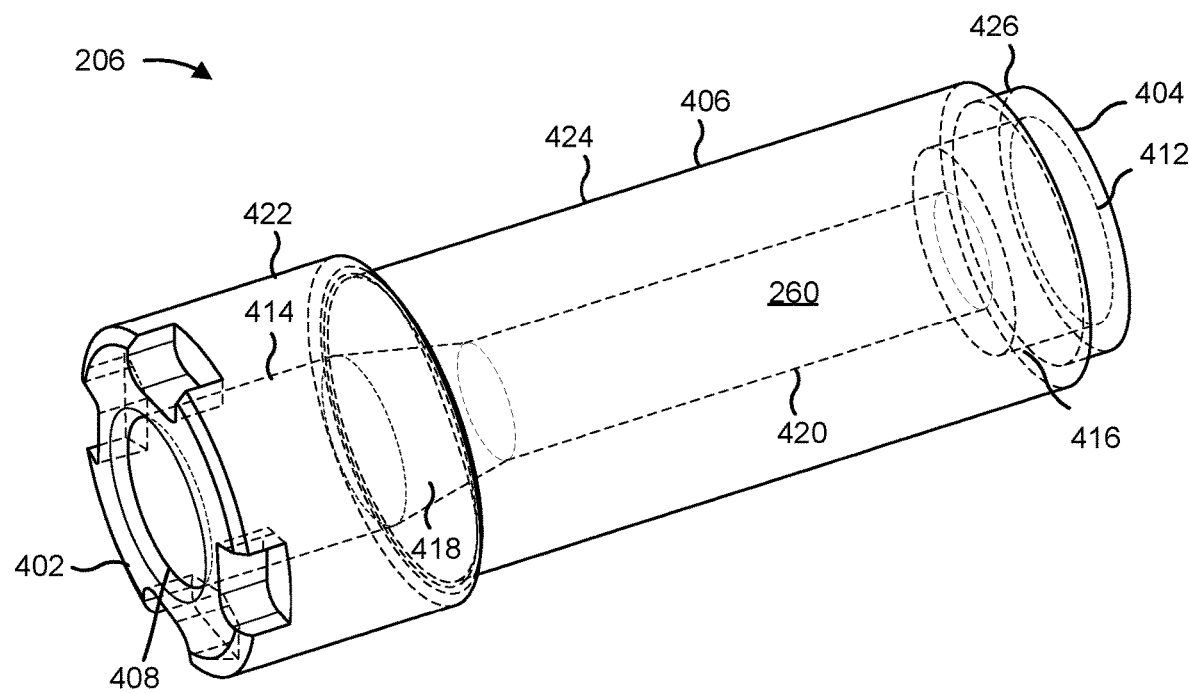
FIG. 5 is an isometric view of the guide element.

FIGS. 4-5 are diagrams of the first guide element 206. FIG. 4 is a cross-sectional view of the first guide element 206. FIG. 5 is an isometric view of the first guide element 206. It should be understood that the first guide element 206 is substantially identical to the second guide element 208 in order to allow the hydraulic fluid to flow in either direction through the longitudinal bore 226.

As shown in FIGS. 4-5, the first guide element 206 includes a first end surface 402, a second end surface 404, and an exterior surface 406 connecting the first end surface 402 to the second end surface 404. The first guide element 206 may be formed from a single, integral piece of material (e.g., steel). The first end surface 402 includes a first opening 408. The first opening 408 may be chamfered to reduce turbulence of the hydraulic fluid passing therethrough. The second end surface 404, which opposes the first end surface 402, includes a second opening 412 that communicates with the first opening 408 to form the first longitudinal bore 260.

The first longitudinal bore 260 includes a first cylindrical section 414, a second cylindrical section 416, a truncated conical section 418, and a third cylindrical section 420. The first cylindrical section 414 is adjacent to the first opening 408, and the second cylindrical section 416 is adjacent to the second opening 412. The truncated conical section 418, which is configured to reduce the turbulence of the hydraulic fluid passing therethrough, is adjacent to the first cylindrical section 414. The third cylindrical section 420 is arranged between the truncated conical section 418 and the second cylindrical section 416. The truncated conical section 418 is tapered such that a diameter of the first cylindrical section 414 is larger than a diameter of the third cylindrical section 420. For example, the diameter of the first cylindrical section 414 may be in a range of approximately 8 mm to approximately 9 mm. The diameter of the third cylindrical section 420 may be in a range of approximately 4 mm to approximately 5 mm. The second cylindrical section 416 is sized to receive an end of the transparent tube 246 (e.g., via a friction fit, clamped between the first guide element 206 and the second guide element 208, or another type of attachment). For example, a diameter of the second cylindrical section 416 may be approximately 8 mm to approximately 9 mm.

Furthermore, the first cylindrical section 414, the second cylindrical section 416, the truncated conical section 418, and the third cylindrical section 420 of the first longitudinal bore 260 have lengths that are configured to ensure that the that the hydraulic fluid enters the transparent tube 246 in a laminar state and with a flow rate in a range of approximately 1.5 liters minute (l/min) to approximately 5 l/min. By ensuring that the hydraulic fluid enters the transparent tube 246 in the laminar state and with the above described flow rate, the first longitudinal bore 260 increases accuracy of the detector 244. For example, the first cylindrical section 414 may have a length in a range of approximately 7 mm to approximately 10 mm. The second cylindrical section 416 may have a length in a range of approximately 5 mm to approximately 7 mm. The truncated conical section 418 may have a length in a range of approximately 4 mm to approximately 7 mm. The third cylindrical section 420 may have a length in a range of approximately 20 to approximately 25 mm.

The exterior surface 406 of the first guide element 206 includes a head portion 422, a shank portion 424, and an end portion 426. In order to threadably secure the first guide element 206 within the longitudinal bore 226, the shank portion 424 may be threaded. The head portion 422 has a diameter that is greater than a diameter of the shank portion 424. For example, the diameter of the head portion 422, which corresponds to a diameter of the first end surface 402, may be in a range of approximately 14 mm to approximately 15 mm. The diameter of the shank portion 424 may be in a range of approximately 12 mm to approximately 14 mm. In order to securely seat the first guide element 206 within the longitudinal bore 226 and against the transparent tube 246, the end portion 426 has a diameter that is less than the diameter of the shank portion 424. For example, the diameter of the end portion 426, which corresponds to a diameter of the second end surface 404, may be in a range of approximately 11 mm to approximately 12 mm. It should be understood that the longitudinal bore 226 has corresponding dimensions.

As indicated above, FIGS. 4-5 are provided as an example. Other examples may differ from what is described with regard to FIGS. 4-5. For example, the number and arrangement of components may differ from that shown in FIGS. 4-5. Thus, there may be additional components, fewer components, different components, differently shaped components, differently sized components, and/or differently arranged components than those shown in FIGS. 4-5. For example, the first guide element 206 and the second guide element 208 (and correspondingly, the housing 202) may be proportionally increased or decreased in size. Thus, as an example and relative to a total length of the first guide element 206, the length of the first cylindrical section 414 may be approximately 20%, the length of the second cylindrical section 416 may be approximately 15%, the length of the truncated conical section 418 may be approximately 12%, and the length of the third cylindrical section 420 may be approximately 53%. As a further example and relative to the diameter of the shank portion 424, the diameter of the first cylindrical section 414 may be approximately 60%, the diameter of the second cylindrical section 416 may be approximately 61%, and the diameter of the third cylindrical section 420 may be approximately 34%. In such an example, the diameter of the truncated conical section 418, relative to the diameter of the shank portion 424, decreases from approximately 60% to approximately 34%.

Figure 6:
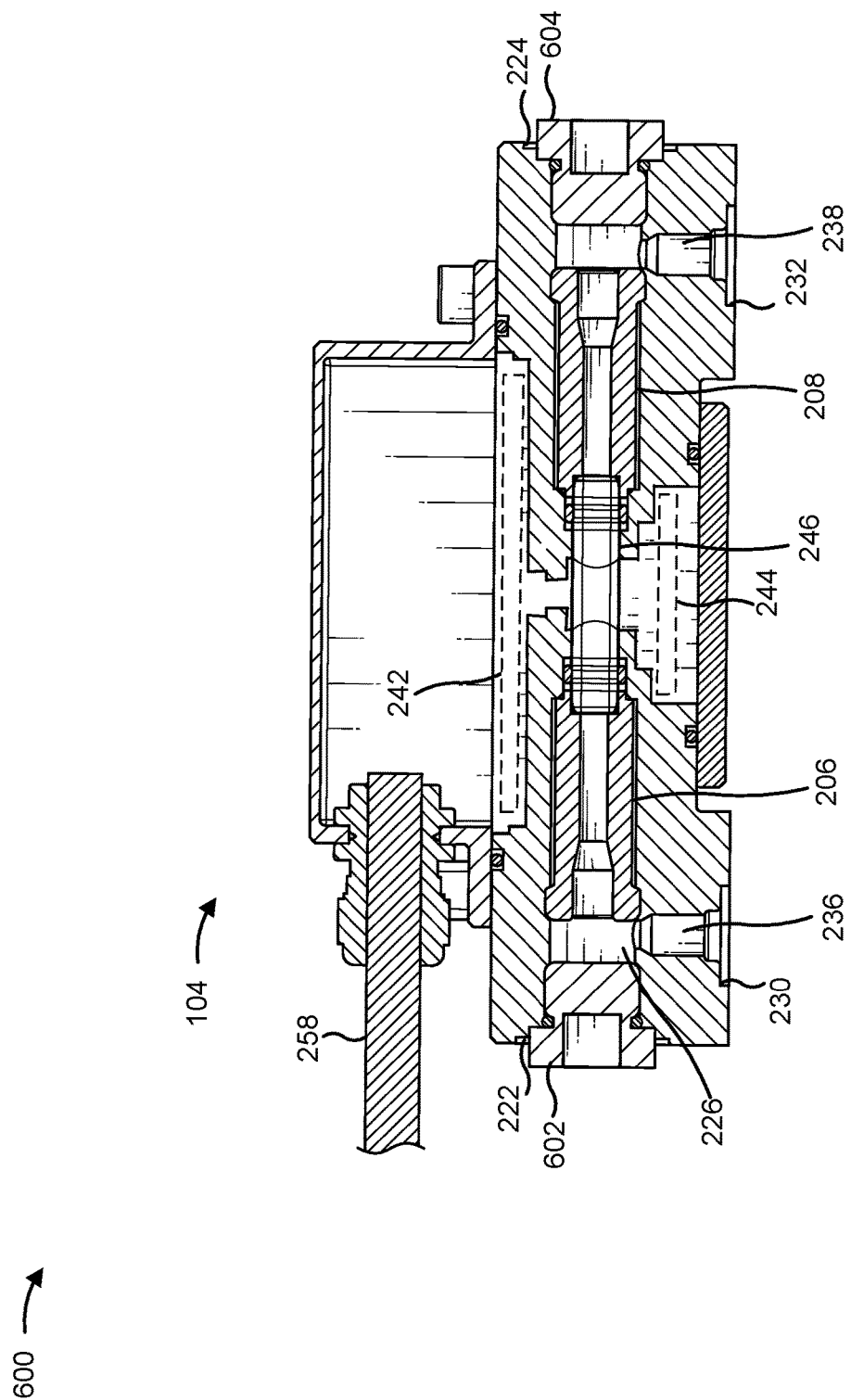
FIG. 6 is a cross-sectional view of the particle sensor assembly in an in-line configuration.
Figure 7:
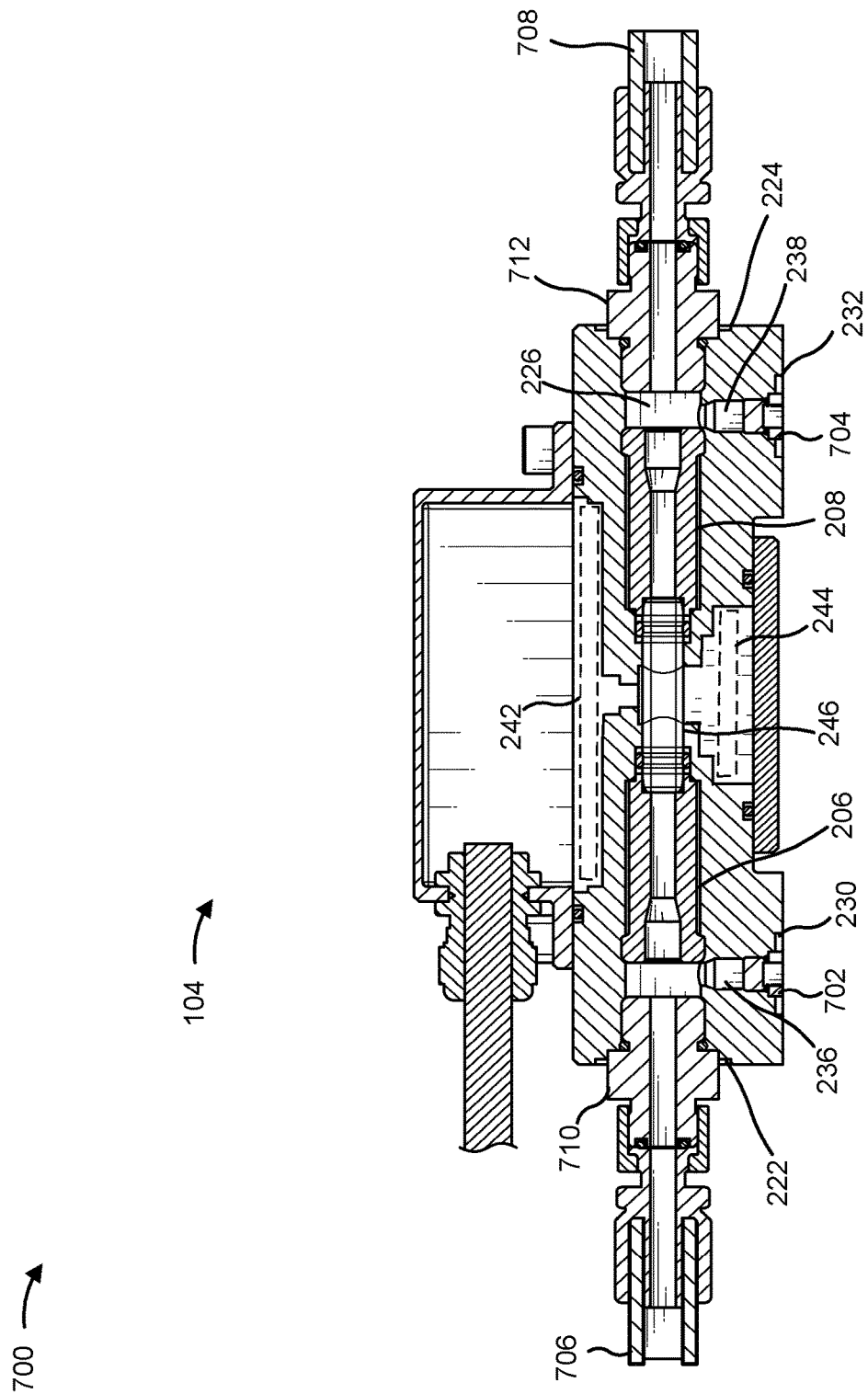
FIG. 7 is a cross-sectional view of the particle sensor assembly in a kidney loop configuration.
Figure 8:
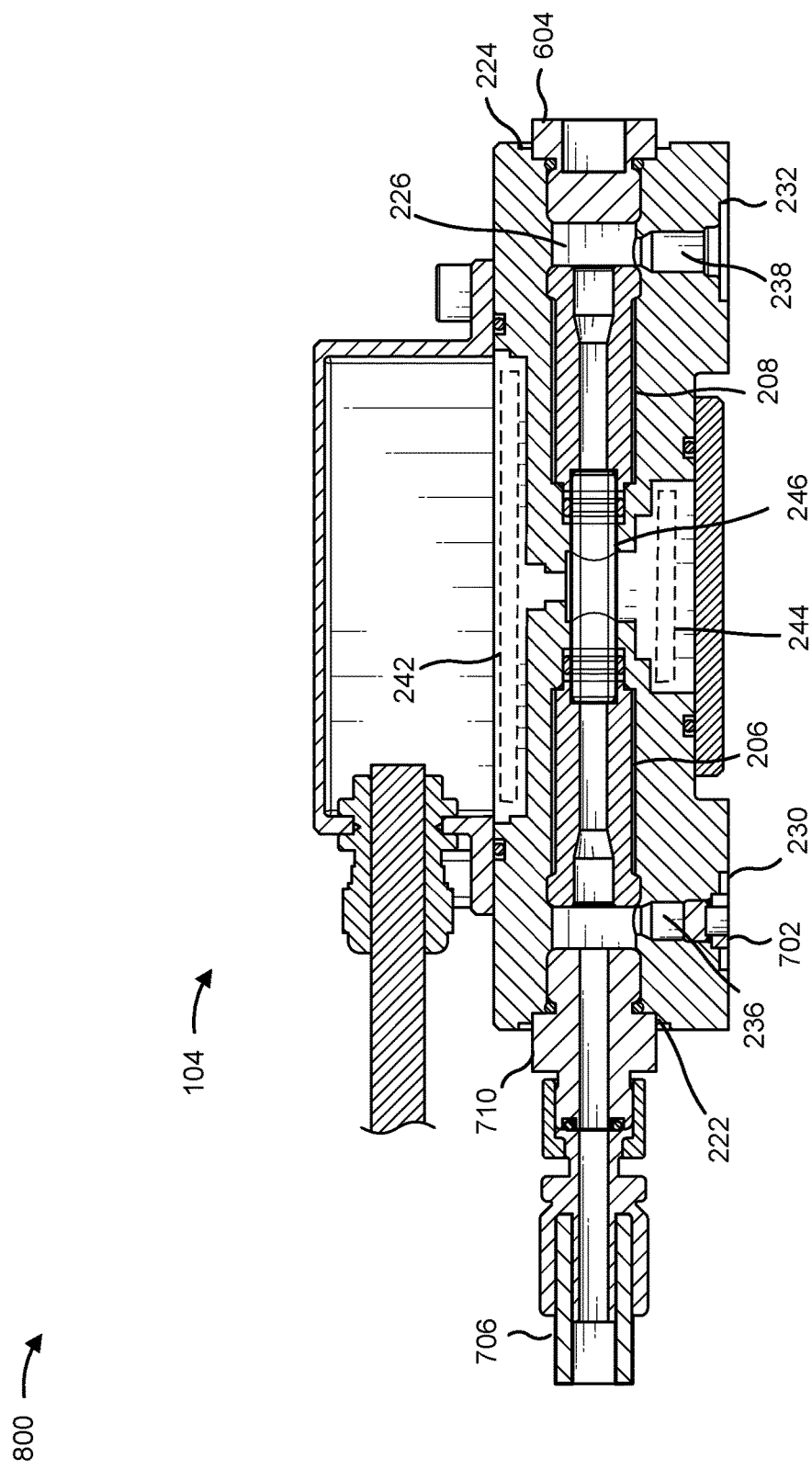
FIG. 8 is a cross-sectional view of the particle sensor assembly in a hybrid configuration.

FIGS. 6-8 are diagrams the particle sensor assembly 104 in different configurations. FIG. 6 is a cross-sectional view of the particle sensor assembly 104 in an in-line configuration 600. FIG. 7 is a cross-sectional view of the particle sensor assembly 104 in a kidney loop configuration 700. FIG. 8 is a cross-sectional view of the particle sensor assembly 104 in a hybrid configuration 800.

As shown in FIG. 6, the in-line configuration 600 of the particle sensor assembly 104 includes a first end plug 602 and a second end plug 604. To limit the path of the hydraulic fluid within the particle sensor assembly 104, the first end plug 602 is removably secured within the first end opening 222 of the longitudinal bore 226, and the second end plug 604 is removably secured within the second end opening 224 of the longitudinal bore 226. For example, the first end plug 602 and the second end plug 604 may be threadably secured within the longitudinal bore 226 or secured via a friction fit attachment, a snap-fit attachment, or another type of attachment.

In use, the particle sensor assembly 104 may be mounted or otherwise secured to the fluid source 102 such that the first bottom opening 230 is aligned with the first hole 106 and the second bottom opening 232 is aligned with the second hole 108. Once the particle sensor assembly 104 is so secured to the fluid source 102, the hydraulic fluid therein may pass along the first intersecting bore 236 to enter the longitudinal bore 226. Due to the change in direction of the flow at the intersection of the first intersecting bore 236 and the longitudinal bore 226, the hydraulic fluid may experience turbulence. As the hydraulic fluid contacts and passes through the first guide element 206, however, the turbulence of the hydraulic fluid may be reduced by the first guide element 206 to render the flow substantially laminar as the hydraulic fluid enters the transparent tube 246. For example, the hydraulic fluid may have a flow rate in a range of approximately 1.5 liters per minute (l/min) to approximately 5 l/min as the hydraulic fluid travels through transparent tube 246. Once the light source 242 is illuminated, light passes from the light source 242 through the transparent tube 246 and the hydraulic fluid. Because debris particles within the hydraulic fluid tend to be opaque, the debris particles may cast shadows on the detector 244, which is configured to process the light pattern to determine the amount of debris particles within the hydraulic fluid. The detector 244, via the electric cable 258, may transmit the information to a user interface (e.g., to alert an operator, to cause the hydraulic system to shut down, and/or the like). After the hydraulic fluid exits the transparent tube 246, the hydraulic fluid may travel along the second guide element 208 and the second intersecting bore 238 and re-enter the fluid source 102 via the second hole 108.

As shown in FIG. 7, the kidney loop configuration 700 of the particle sensor assembly 104 includes a first bottom plug 702, a second bottom plug 704, a first hose 706 (shown in part), and a second hose 708 (shown in part). The first hose 706 includes a first hose connector 710 at each end thereof, and the second hose 708 includes a second hose connector 712 at each end thereof. To limit the path of the hydraulic fluid within the particle sensor assembly 104, the first bottom plug 702 is removably secured within the first bottom opening 230 of the first intersecting bore 236, and the second bottom plug 704 is removably secured within the second bottom opening 232 of the second intersecting bore 238. To extend a length of the path of the hydraulic fluid outside of the fluid source 102 (e.g., to dissipate heat, to reduce the flow rate, and/or the like), the first hose 706 is connected to the first end opening 222 of the housing 202 via one of the first hose connectors 710, and the second hose 708 is connected to the second end opening 224 via one of the second hose connectors 712. Similar to the first end plug 602 and the second end plug 604, the first bottom plug 702, the second bottom plug 704, the first hose connectors 710, and the second hose connectors 712 may be threadably secured or secured via a friction fit attachment, a snap-fit attachment, or another type of attachment In use, the particle sensor assembly 104 may be attached to the fluid source 102 such that an opposing one of the first hose connectors 710 is attached to the first hole 106 and an opposing one of the second hose connectors 712 is attached to the second hole 108. Once the particle sensor assembly 104 is so secured to the fluid source 102, the hydraulic fluid therein may travel along the first hose 706, the longitudinal bore 226, and the first guide element 206 to enter the transparent tube 246. The flow rate of the hydraulic fluid passing through the transparent tube 246 may be in range described above. With the light source 242 illuminated, light from the light source 242 passes through the transparent tube 246 and the hydraulic fluid. Because debris particles within the hydraulic fluid tend to be opaque, the debris particles may cast shadows on the detector 244, which is configured to process the light pattern and transmit information associated with the light pattern, as described above. After the hydraulic fluid exits the transparent tube 246, the hydraulic fluid may travel along the second guide element 208 and the second hose 708 and re-enter the fluid source 102 via the second hole 108.

As shown in FIG. 8, the hybrid configuration 800 of the particle sensor assembly 104 is a combination of the in-line configuration 600 and the kidney loop configuration 700. In particular, the hybrid configuration 800 may include a first bottom plug 702, a first hose 706, and a second end plug 604. To limit the path of the hydraulic fluid within the particle sensor assembly 104, the first bottom plug 702 is removably secured within the first bottom opening, and the second end plug 604 is removably secured within the second end opening. To extend a length of the path of the hydraulic fluid outside of the fluid source 102, the first hose 706 is connected to the first end opening 222 of the housing 202 via one of the first hose connectors 710.

In use, the particle sensor assembly 104 may be attached to the fluid source 102 such that an opposing one of the first hose connectors 710 is attached to the first hole 106 and the second bottom opening 232 is aligned with the second hole 108. Once the particle sensor assembly 104 is so secured to the fluid source 102, the hydraulic fluid therein may pass along the first hose 706 and the first guide element 206 to enter the transparent tube 246. The flow rate of the hydraulic fluid passing through the transparent tube 246 may be in range described above. As described above, light from the light source 242 passes through the transparent tube 246 and the hydraulic fluid and is processed by the detector 244. After the hydraulic fluid exits the transparent tube 246, the hydraulic fluid may travel along the second guide element 208 and the second intersecting bore 238 and re-enter the fluid source 102 via the second hole 108.

As indicated above, FIGS. 6-8 are provided as an example. Other examples may differ from what is described with regard to FIGS. 6-8. For example, the number and arrangement of components may differ from that shown in FIGS. 6-8. Thus, there may be additional components, fewer components, different components, differently shaped components, differently sized components, and/or differently arranged components than those shown in FIGS. 6-8. For example, the hydraulic fluid may flow in the opposite direction through the particle sensor assembly 104. As a further example, the particle sensor assembly 104 may be unidirectional. In such an example, the second guide element 208 may be eliminated or structurally differ from the first guide element 206 (e.g., by having a non-tapered bore rather than a tapered bore, and/or the like).

INDUSTRIAL APPLICABILITY

The particle sensor assembly 104 of the present disclosure is applicable to any system involving a translucent fluid. For example, the fluid may be hydraulic fluid (e.g., mineral oil, water glycol, phosphate ester) or another type of fluid. The system may be implemented in a machine, such as an automobile, a bulldozer, a crane, an excavator, a tractor, or another type of machine.

Due to the compact size of the particle sensor assembly 104, the particle sensor assembly 104 of the present disclosure has significant benefits in terms of cost effectiveness and versatility in application. Such versatility is further enhanced due to the modularity of the particle sensor assembly 104. For example, depending on space constraints, environmental conditions, and/or other factors, the particle sensor assembly 104 may be secured to the fluid source 102 in the in-line configuration 600, the kidney loop configuration 700, or the hybrid configuration 800. Due to the turbulence-reducing features of the first guide element 206 and/or the second guide element 208 (e.g., the chamfered shape of the first opening 408, the truncated conical section 418, and/or the like), the first guide element 206 and/or the second guide element 208 increase the likelihood that the hydraulic fluid enters the transparent tube 246 in a laminar state and at a flow rate in a range of approximately 1.5 l/min to approximately 5 l/m. As a result, the first guide element 206 and/or the second guide element 208 increases accuracy of the detector 244 and may therefore be more effective at protecting the system. Furthermore, the particle sensor assembly 104, due to its modularity, reduces inventory costs associated with ancillary hardware and simplifies installation processes.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A guide element for hydraulic fluid, comprising:
a first end surface, a second end surface, and an exterior surface connecting the first end surface to the second end surface, wherein
the first end surface includes a first chamfered opening,
the second end surface includes a second opening that fluidly communicates with the first chamfered opening to define a longitudinal bore that includes a tapered section,
wherein the first chamfered opening and the tapered section are configured to guide the hydraulic fluid to facilitate transformation of a turbulent flow of the hydraulic fluid into a laminar flow of the hydraulic fluid, and the exterior surface includes:
a head portion that is adjacent to the first end surface, and
a threaded shank portion that is between the head portion and the second end surface,
wherein the head portion has a first diameter that is greater than a second diameter of the threaded shank portion.

2. The guide element of claim 1, wherein
the longitudinal bore further includes a first linear section that is adjacent to the first chamfered opening and a second linear section that is adjacent to the second opening; and
the tapered section is located between the first linear section and the second linear section.

3. The guide element of claim 2, wherein
the longitudinal bore further includes a third linear section that is located between the tapered section and the second linear section; and
a third diameter of the first linear section and a fourth diameter of the second linear section are greater than a fifth diameter of the third linear section.

4. The guide element of claim 1, wherein the tapered section has
a third diameter in a range of approximately 8 millimeters to approximately 9 millimeters,
a fourth diameter in a range of approximately 4 millimeters to approximately 5 millimeters, and
a length in a range of approximately 4 millimeters to approximately 7 millimeters.

5. A guide element for fluid, comprising:
a first end surface, a second end surface, and an exterior surface connecting the first end surface to the second end surface, wherein
the first end surface includes a first opening, and
the second end surface includes a second opening that fluidly communicates with the first opening to define a longitudinal bore,
wherein the longitudinal bore includes:
a truncated conical section that is configured to reduce turbulence of the fluid flowing therethrough,
a first cylindrical section that is adjacent to the second opening, and
a second cylindrical section that is between the truncated conical section and the first cylindrical section,
wherein the first cylindrical section has a first diameter that is greater than a second diameter of the second cylindrical section.

6. The guide element of claim 5, wherein the longitudinal bore is shaped and sized to facilitate transformation of a turbulent flow of the fluid into a laminar flow of the fluid, wherein the laminar flow of the fluid has a flow rate in a range of approximately 1.5 liters per minute to approximately 5 liters per minute.

7. The guide element of claim 5, wherein
the first diameter is in a first range of approximately 8 millimeters to approximately 9 millimeters; and
the second diameter is in a second range of approximately 4 millimeters to approximately 5 millimeters.

8. The guide element of claim 5, wherein the longitudinal bore further includes a third cylindrical section that extends from the first opening to the truncated conical section.

9. The guide element of claim 8, wherein a third diameter of the third cylindrical section is in a range of approximately 8 millimeters to approximately 9 millimeters.

10. The guide element of claim 5, wherein
the first end surface has a first outer diameter; and
the second end surface has a second outer diameter that is less than the first outer diameter.

11. The guide element of claim 10, wherein
the first outer diameter is in a first range of approximately 14 to approximately 15 millimeters; and
the second outer diameter is in a second range of approximately 11 to approximately 12 millimeters.

12. A guide element for hydraulic fluid, comprising:
a first end surface, a second end surface, and an exterior surface connecting the first end surface to the second end surface, wherein
the first end surface includes a first opening,
the second end surface includes a second opening that fluidly communicates with the first opening to define a longitudinal bore that includes a tapered section,
wherein the tapered section is configured to guide the hydraulic fluid to facilitate transformation of a turbulent flow of the hydraulic fluid into a laminar flow of the hydraulic fluid, and
the exterior surface includes:
a head portion having a first diameter, and
a threaded shank portion having a second diameter that is less than the first diameter.

13. The guide element of claim 12, wherein the first opening is chamfered to further guide the hydraulic fluid to facilitate the transformation of the turbulent flow of the hydraulic fluid into the laminar flow of the hydraulic fluid.

14. The guide element of claim 12, wherein the tapered section has a length in a range of approximately 4 millimeters to approximately 7 millimeters.

15. The guide element of claim 12, wherein
the first opening has a third diameter in a range of approximately 8 millimeters to approximately 9 millimeters, and
the tapered section has a fourth diameter in a range of approximately 4 millimeters to approximately 7 millimeters.

16. The guide element of claim 12, wherein the longitudinal bore further includes a plurality of linear sections having different diameters and lengths.

17. The guide element of claim 16, wherein the plurality of linear sections include three linear sections.

18. The guide element of claim 1, wherein the head portion is adjacent to the threaded shank portion.

19. The guide element of claim 1, wherein the longitudinal bore further includes three cylindrical sections having different diameters.

20. The guide element of claim 5, wherein the exterior surface includes:
a first portion having a third diameter,
a second portion having a fourth diameter that is less than the third diameter,
wherein the second portion is threaded, and
a third portion having a fifth diameter that is less than the fourth diameter.

* * * * *